United States Patent
Boerger et al.

(10) Patent No.: US 9,063,941 B2
(45) Date of Patent: Jun. 23, 2015

(54) SYSTEM HAVING AN APPARATUS THAT USES A RESOURCE ON AN EXTERNAL DEVICE

(75) Inventors: Paul Boerger, Loveland, CO (US); Philip M. Walker, Fort Collins, CO (US); David H. Hanes, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3053 days.

(21) Appl. No.: 11/144,977

(22) Filed: Jun. 3, 2005

(65) Prior Publication Data

US 2006/0288040 A1    Dec. 21, 2006

(51) Int. Cl.
G06F 7/00      (2006.01)
G06F 17/30     (2006.01)
G11B 33/10     (2006.01)

(52) U.S. Cl.
CPC .......... *G06F 17/30091* (2013.01); *G11B 33/10* (2013.01)

(58) Field of Classification Search
USPC .................. 707/104, 781, 621, 831, 999.107
See application file for complete search history.

(56) References Cited

U.S. PATENT DOCUMENTS

| | | | |
|---|---|---|---|
| 5,463,772 A | 10/1995 | Thompson et al. | |
| 5,507,130 A | 4/1996 | Young et al. | |
| 5,864,871 A * | 1/1999 | Kitain et al. | 707/104.1 |
| 5,892,915 A | 4/1999 | Duso et al. | |
| 5,974,503 A | 10/1999 | Venkatesh et al. | |
| 5,987,621 A | 11/1999 | Duso et al. | |
| 5,991,753 A | 11/1999 | Wilde | |
| 6,185,574 B1 | 2/2001 | Howard et al. | |
| 6,230,200 B1 | 5/2001 | Forecast et al. | |
| 6,336,120 B1 | 1/2002 | Noddings et al. | |
| 6,405,315 B1 | 6/2002 | Burns et al. | |
| 6,496,837 B1 | 12/2002 | Howard et al. | |
| 6,519,612 B1 | 2/2003 | Howard et al. | |
| 6,625,750 B1 | 9/2003 | Duso et al. | |
| 6,842,770 B1 | 1/2005 | Serlet et al. | |
| 6,898,555 B2 * | 5/2005 | Levi et al. | 702/186 |
| 6,934,812 B1 * | 8/2005 | Robbin et al. | 711/138 |
| 7,308,489 B2 * | 12/2007 | Weast | 709/219 |
| 7,313,809 B1 * | 12/2007 | Mohan et al. | 725/109 |
| 7,359,624 B2 * | 4/2008 | Adams et al. | 386/124 |
| 2003/0009668 A1 * | 1/2003 | Chan et al. | 713/171 |
| 2003/0072453 A1 | 4/2003 | Kelly et al. | |

(Continued)

FOREIGN PATENT DOCUMENTS

| | | |
|---|---|---|
| EP | 1 003 115 | 5/2000 |
| EP | 1003115 | 5/2000 |

(Continued)

OTHER PUBLICATIONS

Windows Media Player, 2000-2002, Microsoft Corporation.*

(Continued)

*Primary Examiner* — Mohammed R Uddin
(74) *Attorney, Agent, or Firm* — Conley Rose, P.C.

(57) ABSTRACT

A system comprises a media player adapted to receive a removable medium. The media player is adapted to couple to a display device. A device external to and communicatively coupled to the media player comprises storage. The media player stores information on the external device's storage. Such information is used by the media player when rendering on said display.

9 Claims, 2 Drawing Sheets

(56) References Cited

U.S. PATENT DOCUMENTS

| | | | |
|---|---|---|---|
| 2004/0003398 A1* | 1/2004 | Donian et al. | 725/34 |
| 2004/0025012 A1* | 2/2004 | Burks | 713/161 |
| 2004/0088731 A1* | 5/2004 | Putterman et al. | 725/94 |
| 2004/0089346 A1* | 5/2004 | Sutardja | 137/377 |
| 2004/0103297 A1* | 5/2004 | Risan et al. | 713/200 |
| 2004/0103300 A1* | 5/2004 | Risan et al. | 713/200 |
| 2004/0131255 A1* | 7/2004 | Ben-Yaacov et al. | 382/190 |
| 2004/0133908 A1 | 7/2004 | Smith et al. | |
| 2004/0133914 A1* | 7/2004 | Smith et al. | 725/86 |
| 2004/0175098 A1* | 9/2004 | Calhoon et al. | 386/46 |
| 2004/0181456 A1 | 9/2004 | Matsumori | |
| 2004/0194154 A1* | 9/2004 | Meadors et al. | 725/153 |
| 2004/0210539 A1 | 10/2004 | Ikeda et al. | |
| 2004/0224638 A1* | 11/2004 | Fadell et al. | 455/66.1 |
| 2004/0236945 A1* | 11/2004 | Risan et al. | 713/165 |
| 2005/0135790 A1* | 6/2005 | Hutten | 386/125 |
| 2005/0146534 A1* | 7/2005 | Fong et al. | 345/619 |
| 2005/0193138 A1* | 9/2005 | Kim | 709/231 |
| 2005/0254365 A1* | 11/2005 | Keung | 369/47.1 |
| 2005/0259532 A1* | 11/2005 | Roman et al. | 369/47.1 |
| 2006/0077773 A1* | 4/2006 | Seo et al. | 369/30.09 |
| 2006/0195909 A1* | 8/2006 | Boswell et al. | 726/26 |
| 2006/0258289 A1* | 11/2006 | Dua | 455/41.3 |
| 2007/0056013 A1* | 3/2007 | Duncan | 725/134 |
| 2007/0076876 A1* | 4/2007 | Kaplan | 380/255 |
| 2007/0288715 A1* | 12/2007 | Boswell et al. | 711/164 |

FOREIGN PATENT DOCUMENTS

| | | |
|---|---|---|
| JP | H04-008055 | 1/1992 |
| JP | H07-193664 | 7/1995 |
| JP | H10-340187 | 12/1998 |
| JP | 11-098467 | 4/1999 |
| JP | 11098467 | 4/1999 |
| JP | 2001188702 A | 7/2001 |
| JP | 2001350631 A | 12/2001 |
| JP | 2003150417 A | 5/2003 |
| JP | 2004-080568 | 3/2004 |
| JP | 2004080568 | 3/2004 |
| JP | 2004-326152 | 11/2004 |
| JP | 2004-328653 | 11/2004 |
| JP | 2004326152 | 11/2004 |
| JP | 2004328653 | 11/2004 |
| JP | 2004334992 A | 11/2004 |
| JP | 2005-092973 | 4/2005 |
| JP | 2005-117515 | 4/2005 |
| JP | 2005092973 | 4/2005 |
| JP | 2005117515 | 4/2005 |
| WO | WO 02/50744 | 6/2002 |
| WO | WO-03034190 | 4/2003 |
| WO | WO-03036541 | 5/2003 |
| WO | WO 03/062962 | 7/2003 |
| WO | 2005/013276 A1 | 2/2005 |

OTHER PUBLICATIONS

Office Action dated Sep. 26, 2007, Japanese Patent Application No. 2006-147759, 2 pp.

Office Action dated Jan. 28, 2008, Japanese Patent Application No. 2006-147759, 2 pp.

* cited by examiner

SYSTEM HAVING AN APPARATUS THAT USES A RESOURCE ON AN EXTERNAL DEVICE

BACKGROUND

There is a general desire to increase the functionality and performance of an electronic device, such as a media player. All else being equal, unfortunately, the cost of a device usually increases as the device's functionality is increased.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

Figure 1:
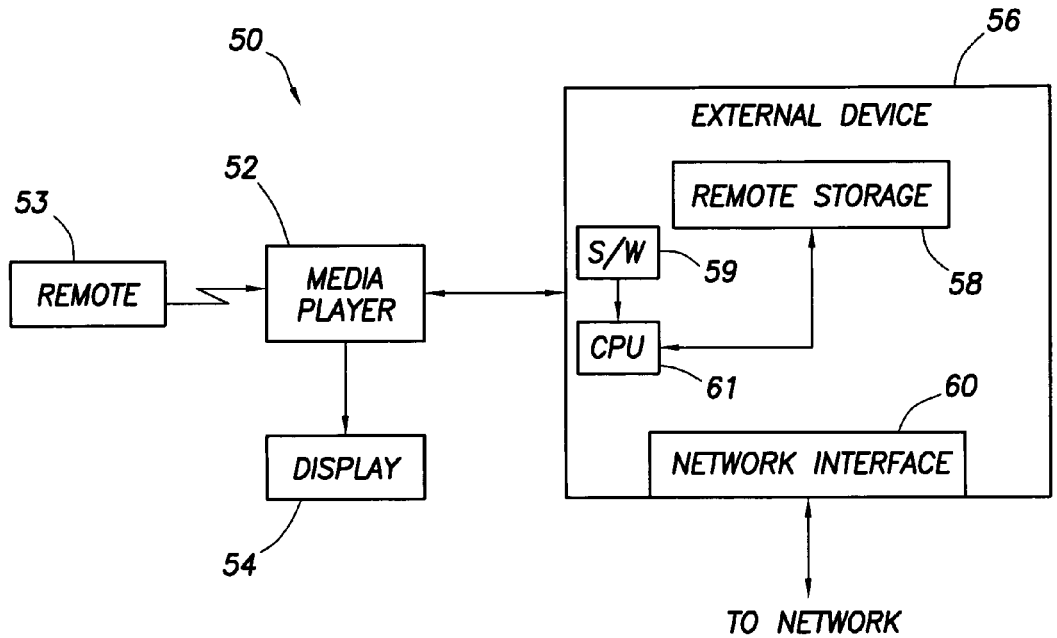
FIG. 1 shows a system in accordance with embodiments of the invention.

Referring to FIG. 1, a system 50 is shown comprising an apparatus 52 coupled to a device 56 that is external to the apparatus. In the exemplary embodiments discussed herein, the apparatus 52 comprises a media player, but in general the apparatus can be other than a media player, such as a set top box. As a media player, the apparatus is adapted to receive a removable medium and play content stored on and/or related to the content of the removable medium. In some embodiments, a removable medium comprises an optical disc. In general, the apparatus 52 is any apparatus that, in at least some modes of operation, can function as a standalone device without assistance from an external device 56. The content of the disc may comprise video, audio, graphic, or other types of information. The disc may contain, for example, a movie that the media player 52 plays through a display device 54 coupled to the media player 52. The display device 54 may comprise a television or other suitable monitor and may comprise video and audio playback capability. The media player 52 may be operated by a user via controls provided as part of the media player or via a remote control 53. Such controls permit a user to perform various actions such as play, stop, pause, rewind, fast forward, etc.

In accordance with embodiments of the invention, the media player 52 uses one or more resources provided by the external device 56. The external device may comprise a computer or a stand-alone storage device. In either case, the external device comprises remote storage 58, software 59, a network interface 60 through which the external device 56 connects to a network, and a central processing unit (CPU) 61. Storage 58 is referred to as "remote" storage to signify that storage 58 is located external to the media player 52. The network may comprise the Internet or other network from which information can be downloaded for storage in the external device's storage 58 or in the media player 52, to the extent the media player has any built-in storage capacity. Because the media player 52 uses the external device's resources (i.e., the remote storage 58 and network interface 60), such resources need not be duplicated in the media player thereby enabling the media player 52 is to built at lower cost yet still provide enhanced functionality (described below) that the storage 58 and network interface 60 enables. Moreover, the media player 52 can receive a disc encoded so as to take advantage of such enhanced functionality and the media player can provide such enhanced functionality, albeit by taking advantage of resources available in the external device. In some scenarios, a user may already have a personal computer which functions as external device 56. By obtaining a media player 52 implemented according to the teachings of the present invention, and connecting the media player 52 to the user's existing computer, the resulting system 50 is bestowed with enhanced functionality without the user having to purchase a media player that itself contains the storage and network interface resources sufficient to provide such enhanced functionality.

Figure 2:
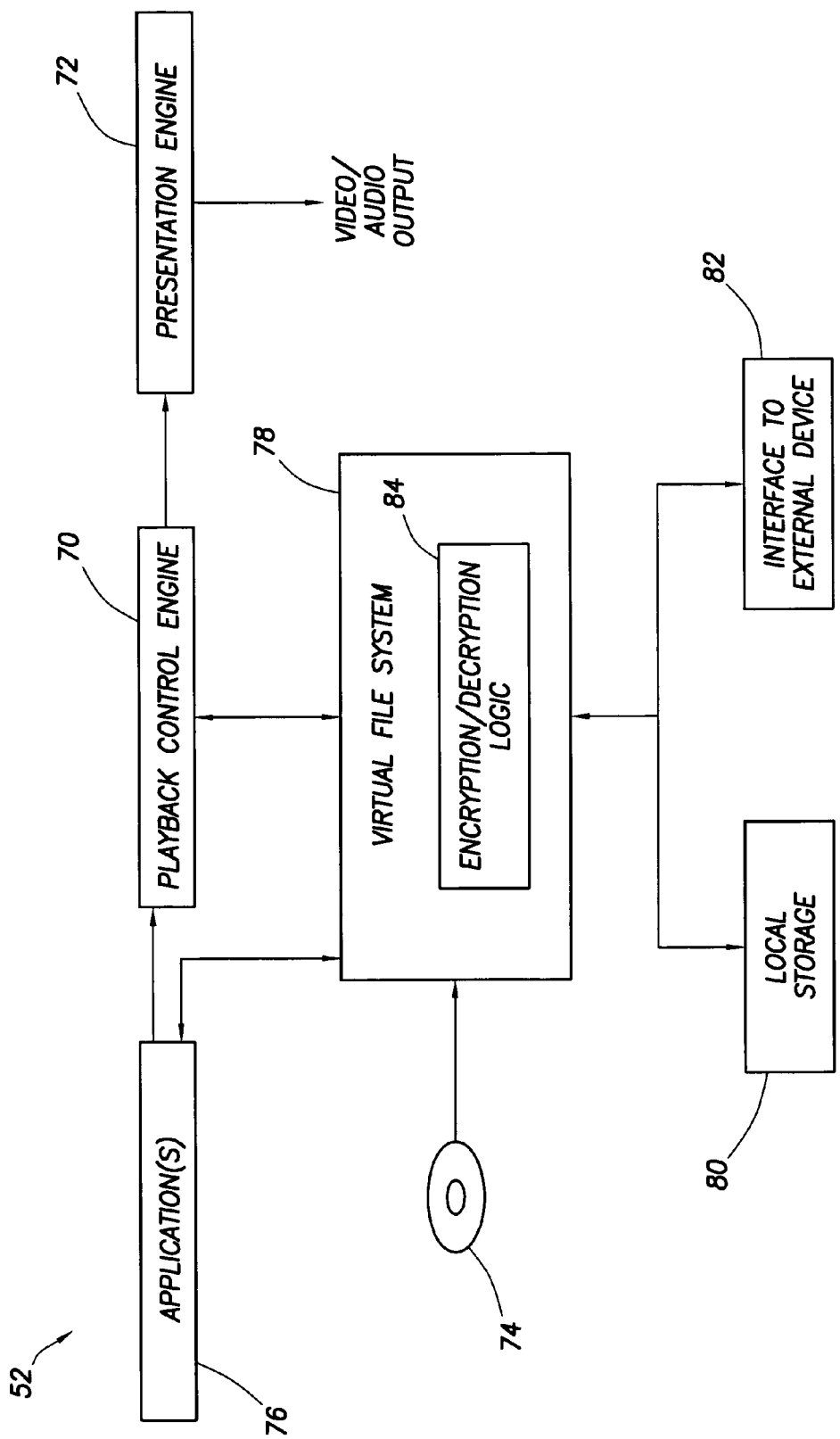
FIG. 2 shows a block diagram of a media player in accordance with embodiments of the invention.

FIG. 2 shows an exemplary block diagram of the media player 52. In the embodiment shown in FIG. 2, the player comprises a playback control engine 70, a presentation engine 72, a virtual file system (VFS) 78, a local storage 80, and an interface 82 to external device 56. The local storage 80 comprises non-volatile storage. In one embodiment, the local storage 80 comprises flash memory.

In some embodiments, the interface 82 may comprise a universal serial bus (USB) connection. The VFS 78 communicates with the remote storage 58 in the external device by way of a USB mass storage class protocol. For those USB standards that do not permit a peripheral device to invoke an operation on a host, the external device 56 periodically polls a USB endpoint to determine if the VFS 78 has a request targeting the external device. In the example of a request to retrieve data from remote storage, when the VFS 78 sends the request, the external device (e.g., the remote storage 58) receives, decodes, and processes the request and returns the specified data to the VFS and a USB endpoint. The VFS 78 receives the data from remote storage 58 and then decodes and processes the data. In other embodiments, the interface 82 may comprise an Institute of Electrical and Electronics Engineers (IEEE) 1394 bus, or other interface.

The player 52 accepts a disc 74. The disc 74 may contain one or more applications 76 (e.g., Java™ applets) that are executed on the player and interact with the playback control engine 70. In response to a user, for example, pressing a play button on the remote control 53, the playback control engine 70 receives a "play list" from the VFS 78. The play list contains references (e.g., pointers) to one or more clip files stored on disc 74 that comprise the content (e.g., movie) the user desires to play. The playback control engine 70 requests each clip file in succession from the virtual file system and provides each such clip to the presentation engine 72. The presentation engine 72 decodes each clip file and generates corresponding video and/or audio output signals to be provided to the display 54.

The VFS 78 comprises an application programming interface (API) that facilitates access by a device (e.g., the playback control engine 70) to the disc 74, local storage 80 and remote storage 58. The disc 74 may have a file system stored on the disc and thus the term "virtual file system" is used simply to differentiate the player's file system from any file system that the disc may contain. The VFS 78 provides a mapping, for example, between requests for files and the physical location of such files, which may be on the disc 74, the media player's local storage 80 or the external device's remote storage 58. The mapping provided by the VFS 78 permits the playback control engine 70 to submit a request for a file yet be "oblivious" as to the location of the requested file. Instead, the VFS bears the onus of keeping track of the location of the various files.

While some discs 74 may not contain an application 76, other discs do contain such an application. The application 76 may perform any one or more of a variety of functions. For example, an application may enable a user to selectively cause a file to be downloaded from the network to the external device 56 via the external device's network interface 60. In at least one embodiment, upon loading a disc into the player 52, the application 76 contained on the disc begins to execute on the player. The application 76 may automatically cause (i.e., not requiring a prompt from a user) software 59 on the external device to access a pre-defined website to determine if files associated with the disc currently loaded into the player are available to download. Such a pre-defined website may be encoded into the software 59 in any suitable form such as a uniform resource locator (URL) or Internet Protocol (IP) address. The application 76 will cause the VFS 78 to pass on the identity of the pre-defined website (e.g., URL, IP address) to the external device which uses the identity to access the target website. The software 59 is executed by the external device's CPU 61. If a file has already been downloaded, there may be a more recent version of that file on the pre-defined website. At any rate, the user of the media player 52 may be provided a menu of choices on display 54 from which to choose and may choose one or more files to download. Alternatively, the application 76 may have been programmed to make a choice on behalf of the user or the creator of the disc (or other party), and to automatically download one or more files without offering choices to the user.

Software 59 described above may comprise an application that receives commands from the media player 52 and interacts with other software or hardware in the external device to effectuate the commands. If a command for example requires access to a website via network interface 60, software 59 interacts with other software that is present to provide network connectivity to the external device. Such other software may comprise, for example, a network interface controller driver.

The file(s) to download may be any desired type of file. For example, the files may contain subtitles associated with the movie that was released on disc before such subtitles were available. Another example of downloadable files associated with media content on disc 74 include movie trailers. Upon pressing a button on remote control 53 with a particular disc 74 loaded into the player, the media player 52 may cause such a file to be downloaded via the external device 56 thereby using the network resource provided by the external device.

Each file that is downloaded to system 50 is associated with a particular disc. Such downloaded files as well as the play lists, index table, movie object, and clip files associated with a particular disc are associated with each other by way of the VFS. This association is referred to as "binding." That is, these various files are bound together. The binding permits the VFS to keep track of which files are associated with each other. In one embodiment, the downloaded, bound files associated with a particular disc 74 are stored in local storage 80 when a user loads that disc into the player so that the files will be available to the media player. In some embodiments, the media player 52 does not have any local storage 80 and thus the remote storage 58 is used in place of the media player's local storage for the downloaded, bound files. In still other embodiments, the media player has only a limited amount of local storage 80 and logic is provided to manage the use of the local storage for the downloaded, bound files associated with the currently loaded disc 74.

If the media player has local storage 80 and has sufficient capacity in the local storage 80 to store a new file, a file to be downloaded via external device 56 is downloaded by the media player 52, through network interface 60 with assistance from the external device and transferred to local storage 80. If, however, the media player does not have any local storage 80 or an insufficient amount of local storage for storing the new file, or possibly for other reasons, the new file is stored instead in the remote storage 58 of the external device 56. The VFS 78 updates its mapping (binding) to reflect that the downloaded file is at a particular physical location in either local or remote storage 80, 58. Thus, when the playback control engine 70 or application 76 subsequently requests that particular previously downloaded file to play, the VFS is able to access the file regardless of its location.

In at least one embodiment, the VFS 78 is by default disabled from providing access to one or more or all resources (e.g., remote storage 58, network interface 6) on the external device 56. For example, remote storage 58 is disabled by default and network interface 60 is enabled by default. The VFS 78 responds to various API invocations with regard to external device 56. An application 76 may access a "query" API invocation to VFS 78. In response to the query invocation, the VFS reports whether an external device is, in fact, connected to the media player 52. Using the query API or other API invocation, an application 76 may also request the amount of available space on remote storage 58. The application 76 can also choose to enable the VFS 78 to access the external device's resources. The application 76 invokes an "enable remote storage" function of the VFS API, for example, to cause the VFS to enable access to the remote storage 58. Alternatively, the application 76 can choose for the VFS to continue to be disabled from accessing the remote storage. In some embodiments, an enable API function generally applies to all resources in the external device, at least all of those resources that the media player 52 is capable of using. In some embodiments, multiple API functions are provided with each such function enabling access to a specific resource in the external device. For example, access to the remote storage 58 can be enabled without regard to other external device resources. In other embodiments, an enable API may be provided that enables or disables multiple or all resources of the external device.

In some embodiments, the default configuration of the VFS 78 with regard to enablement or disablement of resources on external device 56 depends on the type of disc that is inserted into the player. For example, the default configuration can be different for discs that have applications 76 compared to discs without applications. If the disc contains an application, the remote storage 58 is disabled by default, and remains disabled unless the application enables it, as described herein. However, if the disc does not contain an application (for example, a high definition movie (HDMV) disc), then the remote storage 58 is enabled by default. In this way, remote storage can be enabled for discs that are not otherwise able to modify the default setting.

An application 76 may also invoke a "disable" API to cause the VFS to disable access to the external device. Further still, multiple disable API functions may be provided, each such disable function causing access to be disabled to certain external device resources.

An application 76 may invoke an "enable" API function that accepts a boolean parameter to signify whether one or more external device resource are to be enabled or disabled. If the value of the boolean parameter is "true," the target resource(s) are enabled, and if "false" the target resource(s) are disabled. Other embodiments may inverse the interpretation of the boolean parameter.

In some embodiments, the connection between the media player 52 and the external device 56 may not have sufficient performance characteristics (e.g., bandwidth, maximum latency, etc.) to enable files to be streamed directly from the remote storage 58 to the playback control engine 70 without intervening buffers on the media player 52.

In some embodiments, the media player 52 has only a limited amount of local storage 80. Earlier discussion explains what happens when a user desires to download a new file into a system 50 that has no or insufficient local storage for the newly downloaded file. The following discussion pertains to the operation of system 50 when a user loads a disc 74 into the player when one or more files (e.g., clip files, play lists, etc.) have already been downloaded to the system relative to and bound to that particular disc. The operation of the media player 52 in this situation depends on the location of the previously downloaded files (either in the local or remote storage 80, 58), whether the media player 52 even has any local storage and, to the extent the media player has local storage, the available free capacity of such local storage. The following discussion pertains to the previously downloaded files bound to a particular disc. There are other files that are also bound to the disc such as clip files, play lists, etc. Such other files are stored on the disc itself and need not be loaded into local storage 80.

If the previously downloaded files bound to the currently loaded disc are located on local storage 80, such files are accessed from local storage. If, however, the previously downloaded files are located on remote storage 58, then such files may be transferred to the media player's local storage, if present. As described earlier, such transfers may instead occur between playback sessions. If the media player does not have any local storage, or if directed by local storage cache policies in effect, the files are simply accessed from the remote storage 58 as needed. In some embodiments, the media player transfers information (e.g., downloaded files) in its entirety from the remote storage 58 to the local storage 80 and uses such transferred information from the local storage. In other embodiments, the media player uses the information directly from the remote storage without first causing the information to be transferred in its entirety to the media player. The scenario in which the media player has local storage, but the relevant previously downloaded files are located on remote storage 58 will now be described.

In the embodiment in which the files the media player are to use are located on remote storage 58, the playback control engine 70 builds a list of one or more physical file locations that will be used during a playback session at the outset of the session. In this embodiment, the playback control engine 70 issues requests to the VFS prior to the beginning of the session to build a list of the actual physical file locations, and is thereafter able to directly access all physical files to be used during the playback. If an embodiment provides the interfaces to support direct access by the playback control engine 70 to files stored in the remote storage 58, then intermediate buffering of remote files is not performed and the media player accesses the files directly from remote storage 58 without first copying them to local storage 80. However, if player 52 does not provide direct access by the playback control engine 70 to remote storage 58, then one or more of such files to be used which are not already present in local storage 80 are transferred to local storage 80 prior to the commencement of each playback session.

The media player 52 may comprise local storage 80, but the local storage may have insufficient capacity to store additional files associated with a newly loaded disc. For example, subtitle files, trailers, etc. associated with a particular disc may already be loaded into local storage 80 of the media player, but if the user loads a new disc into the player, the local storage may not have enough capacity for the files (currently stored in remote storage 58) associated with the newly loaded disc. This scenario is addressed by the media player 51 being able to use the local storage 80 as temporary storage for the currently loaded disc's downloaded bound files.

Figure 3:
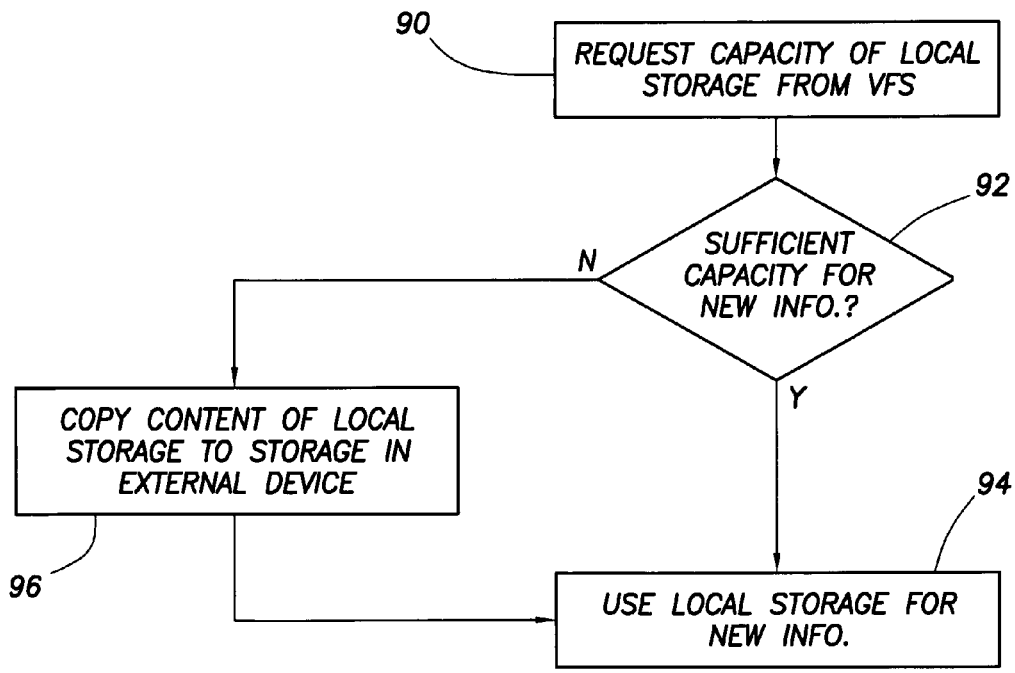
FIG. 3 shows a method embodiment.

In one embodiment, each application 76 comprises the following functionality depicted in FIG. 3. The actions depicted in FIG. 3 are performed when the user loads a disc into player 52 and an application stored on the disc being loaded for execution by the player. Upon execution of application 76, the application ascertains whether previously downloaded files that are bound to the disc can be stored in the local storage 80 of the media player 52. At action 90 of FIG. 3, the application 76 requests the VFS 78 to report the available (i.e., free) capacity of the media player's local storage 80 for storing additional information. The VFS also lists the previously downloaded files, if any, bound to the relevant disc and the size of each such file. The application 76 determines the collective size of the bound files. If the capacity of local storage 80 is sufficient for storing the bound files (decision 92), then control passes to action 94 in which the local storage 80 is used store the files which may be retrieved from the remote storage 58. If, however, the local storage 80 has insufficient available capacity for storing the relevant bound files (perhaps due to local storage already containing files associated with other discs), then application 76 causes the contents of the local storage 80 to remote storage 58 to be altered. Altering the contents comprises an action such as copying some or all of the contents of the local storage 80 to the remote storage 58 in the external device 56 to make room for the new bound files or deleting some or all of the contents of the local storage. In at least one embodiment, the local storage 80 has sufficient capacity for the downloaded bound files associated with only a single disc. Accordingly, the application stored on each disc is responsible for managing the use of the player's local storage to accommodate the downloaded files for that disc. In one embodiment applications are provided with sufficient permissions to be able to delete files in local storage that are associated with other discs (i.e., are not bound to the current disc), thereby enabling the currently executing application to manage local storage. Alternatively, if such permissions are not given, the embodiment automatically deletes at least one unbound file in local storage to service the local storage requests of the currently executing application, relieving applications of the responsibility for managing local storage.

The actions performed by the application in FIG. 3 assume that the VFS of media player is capable of responding to the inquiries from the application as explained above. In other embodiments, the application 76 first ascertains whether the media player is capable of permitting the application to perform the actions such as illustrated in FIG. 3. Any mechanism can be employed to enable the application to ascertain the nature of the VFS 78. For example, a VFS API function can be provided or a reserved bit in a register (readable by the application) can be set to a defined value (e.g., from 0 to 1 or vice versa) to indicate whether the VFS as the functionality described above. If, upon determining the available functionality, the application 76 determines the VFS is not equipped to enable the actions to be performed, the application proceeds without performing one or more actions illustrated in FIG. 3. In this situation, the media player is not coupled to an external device and presumably has sufficient local storage to accommodate all files associated with the discs that have been played on player 52. If application 76, however, determines, by reading the bit, that the VFS is equipped to enable embodiments such as that illustrated in FIG. 3 to be performed, then media player's local storage is used as described above.

In another embodiment, the media player has no local storage 80 and thus the VFS communicates the lack of local storage to the application. In this scenario, the application does not attempt to copy contents of local storage (because there is no local storage) and the application simply defers to the VFS for coordinating access to the previously downloaded files from remote storage 58.

In yet another embodiment, the VFS 78 comprises the functionality described above regarding the use of the local storage 80 as temporary storage. In this embodiment, the VFS 78 receives a request from the application for one or more previously downloaded, bound files associated with the disc loaded into the player. Upon the first such request for that particular disc, the VFS determines the available free space of the local storage, compares that amount of space to the collective size of the downloaded bound files for the current disc, saves contents of the local storage to the external device's storage if necessary and then uses the local storage for the files associated with the current disc. Once the contents are copied to the remote storage 58, that portion of the local storage that contained the copied contents is marked as available to be overwritten.

In another embodiment, the VFS copies current contents of the local storage 80 to make room for new files on an "as-needed" basis. Accordingly, rather than copying all of the contents of the local storage at once to make room for all of the previously downloaded files bound to a newly installed disc, the VFS 78 performs the copying to remote storage of the current local storage contents and retrieving the new file(s) in a piece-meal fashion similar to the operation of some types of cache memory.

In some embodiments, the VFS comprises encryption/decryption logic (EDL) 84 (FIG. 2). In other embodiments, the EDL 84 is provided separate from the VFS. The EDL 84 encrypts downloaded information pertaining to a particular disc and stores the encrypted information on the storage 58 of the external device 56. In a reciprocal action, the VFS retrieves the encrypted information from the storage 58 in response to a request for such information from, for example, an application 76 or playback control engine 78 and the EDL 84 decrypts the encrypted information. The VFS then provides the decrypted information to the request of such information. Any suitable mechanism for encrypting and decrypting can be implemented. For example, any of a variety of public key/private key-based techniques can be employed. The private and public keys are stored in the VFS 78 of the media player. Encrypting the information may be desired to protect the information from unauthorized copying and use. For example, the information may comprise copyrighted subject matter and encrypting such subject matter provides added protection.

As explained above, some discs 74 have an application 76 and other discs may not have an application 76. Those discs that do have the application 76 are able to take advantage of the media player's ability to gain access to the external device's resources (storage, network connectivity). However, a disc that does not have such an application can still be played on media player 52, albeit possibly without the benefit of the external device's resources. A disc without an application benefits from external device resources when played on a media player that supports direct access to remote files by the playback control engine 70, as described previously. In that embodiment, the playback control engine uses remote storage 58 as if it were the local storage 58.

The above discussion is meant to be illustrative of the principles and various embodiments of the present invention. Numerous variations and modifications will become apparent to those skilled in the art once the above disclosure is fully appreciated. For example, the media player 52 can be connected to a plurality of external devices. In such an embodiment, the media player can use one or more resources (e.g., storage, network connections) of each of the plurality of external devices. Further, information can be downloaded using the external device 56 and loaded onto a portable USB storage device. The USB storage device can then be connected to a USB port on the media player (e.g., interface 82 comprises an externally accessible USB port) and the media player 52 obtains the requested information from the USB storage unit. It is intended that the following claims be interpreted to embrace all such variations and modifications.

What is claimed is:

1. An apparatus, comprising:
a playback control engine adapted to play media data from a removable disc loaded into said apparatus;
logic that accesses information stored in a device external to said apparatus on behalf of said playback control engine when playing said media data; and
local storage;
wherein said logic determines whether available free space on said local storage is sufficient to store information pertaining to the removable disc.

2. The apparatus of claim 1 wherein said logic comprises a file system.

3. The apparatus of claim 1 wherein said logic causes said information to be transferred to said apparatus in its entirety before said playback control engine uses said information.

4. The apparatus of claim 1 wherein said logic causes the external device to download said information from a network.

5. The apparatus of claim 1 wherein if said available free space is not sufficient, said logic is adapted to cause contents of said local storage to be copied to storage external to said apparatus so that said local storage can be used to store said information.

6. An apparatus, comprising:
a playback control engine adapted to play media data from a removable disc loaded into said apparatus;
logic that causes information from a network to be downloaded to a device external to said apparatus, said information being usable by said playback control engine; and
storage coupled to said logic;
wherein, after receiving the removable disc, said logic determines whether an update is available on the network for said information; and
wherein said logic provides access to said information once stored in said external device.

7. A system, comprising:
- a media player adapted to receive a removable medium, said media player adapted to couple with a display device;
- a local storage containing content;
- a device external to and communicatively coupled to said media player, said external device comprising storage, and the storage further containing content; and
- a virtual file system that binds content from the removable medium to content of at least one of said local storage and said external device.

8. The system of claim 7 wherein said virtual file system comprises logic to bind the contents from said removable medium, said local storage and said external's device storage.

9. The system of claim 7 wherein said content comprises video, audio, and/or Java applets.

\* \* \* \* \*